United States Patent
Johansson et al.

(10) Patent No.: US 7,003,579 B1
(45) Date of Patent: Feb. 21, 2006

(54) PROCEDURE AND DEVICE FOR CONTROL OF DATA FILE TRANSMISSION

(75) Inventors: Joachim Johansson, Lulea (SE); Anders Bergsten, Lules (SE); Niklas Borg, Lulea (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/926,451

(22) PCT Filed: May 3, 2000

(86) PCT No.: PCT/SE00/00881

§ 371 (c)(1),
(2), (4) Date: Feb. 1, 2002

(87) PCT Pub. No.: WO00/68835

PCT Pub. Date: Nov. 16, 2000

(30) Foreign Application Priority Data

May 6, 1999 (SE) .................................... 9901638

(51) Int. Cl.
G06F 15/16 (2006.01)

(52) U.S. Cl. .................. 709/230; 709/232; 709/233

(58) Field of Classification Search ................ 709/230, 709/231, 232, 233; 707/205; 370/400
See application file for complete search history.

(56) References Cited

U.S. PATENT DOCUMENTS

| | | | |
|---|---|---|---|
| 6,003,045 A * | 12/1999 | Freitas et al. ................ | 707/205 |
| 6,085,251 A * | 7/2000 | Fabozzi, II ................ | 709/230 |
| 6,460,087 B1 * | 10/2002 | Saito et al. ................ | 709/232 |
| 6,765,868 B1 * | 7/2004 | Dunn et al. ................ | 370/400 |

FOREIGN PATENT DOCUMENTS

| EP | 0512174 | 11/1992 |
|---|---|---|
| EP | 0862304 | 9/1998 |

OTHER PUBLICATIONS

L. Berdahl: "Parallel Transport Protocol Proposal", pp. 3-8, figures 8-9 Retrieved on Feb. 20, 2000 Retrieved from the internet: <URL:ftp//ftp.cs.dartmouth.edu/pub/pario/berdahl: transport.ps.Z>, labeled Draft, Jan. 1995, 54 pgs.
Richard W. Watson, et al.: "The parallel I/O Architecture of the High-Performance Storage System (HPSS)" Proceedings of the 14th Symposium on Mas Storage Systems, vol. 1995, pp. 30-33; p. 35; p. 39, p. 40 1995.

* cited by examiner

Primary Examiner—Patrice Winder
(74) Attorney, Agent, or Firm—Oblon, Spivak, McClelland, Maier & Neustadt, P.C.

(57) ABSTRACT

A procedure for control of data file transmission between transmitting and receiving units, at which examples of the data file to be transmitted/transferred are stored at a plurality of the transmitting units, and a device to effect this procedure. The control of the data file transmission is performed according to the following procedure. Transmission of segments of the wanted data file from a plurality of transmitting units is requested, and these segments are received from the transmitting units. When the transmission of a segment of the data file from a first server is finished, transmission of one more segment of the data file is requested, for which transmission from another server has started but not been finished, from the first server. This is after that repeated until all segments have been transmitted, at which transmissions in progress are stopped and the segments are put together to the wanted file.

10 Claims, 3 Drawing Sheets

PROCEDURE AND DEVICE FOR CONTROL OF DATA FILE TRANSMISSION

FIELD OF THE INVENTION

The invention relates to transmission of data files. More specifically the invention relates to a procedure for control of data file transmission between transmitting and receiving units, at which examples of the data file that shall be transmitted are stored at a plurality of units. The invention also relates to a device to perform this procedure.

TECHNICAL BACKGROUND

At transmission of data files from a transmitting unit, or a server, to a receiving unit, for instance over Internet, it frequently occurs that the transmitting unit, or the network that is utilized for the transmission, is overloaded. This may result in that the transmission speed from a server to the receiving unit will be very low, which in its turn results in very long transfer times and also can result in that the transmission will be unsuccessful.

However, it is usual, i.a. on the Internet, that files are copied and distributed to a plurality of servers in order to share the load on these servers that files that are frequently requested to be transmitted can result in. This will reduce the risk of overloading and, of course, also opens for the possibility to break off a too slow transmission of a file, and request a transmission of the file from another server.

A problem in the situation is that the user or the receiving unit does not know which server, or which part of the network, that for the time being has a low load. By that there also will be the risk that also this server is, or will be, overloaded and that the transmission is slowed down or has to be broken. There also is a risk of imbalance of networks and servers.

SUMMARY OF THE INVENTION

Consequently one aim of the invention is to create a procedure, and a corresponding device, for control of data file transmission that reduces the risk of overload of transmitting units and transmission networks.

It is also an aim of the present invention to create a procedure, and a corresponding device, that makes a more efficient control of data file transmission between transmitting and receiving units.

Above said and other aims are effected, according to the present invention, by a procedure and a device with the characteristics that are defined in the independent patent claims. Preferred embodiments are defined by the dependent patent claims.

According to a first aspect of the invention, this is expressed in a procedure of, by way of introduction, mentioned kind, including the steps to request transmission of segments of the data file from a plurality of transmitting units, and to receive segments from a plurality of transmitting units.

According to a second aspect of the present invention, a device is made, comprising device to request transmission of segments of the data file from a plurality of transmitting units, and device to receive said segments from a plurality of transmitting units.

The invention consequently is based on the understanding of the advantage of the transmission of the wanted data file being made from a plurality of transmitting units by different segments of the data file being transmitted from the different transmitting units. This results in the advantage that if a transmitting unit is overloaded, and the transmission speed from this unit is greatly reduced, only one segment of the file is influenced. By that, the total transfer time of the file can be considerably reduced compared with if the whole file should be transmitted from a unit with low transmission speed. This solution requires that at least one example of the data file that shall be transmitted exists at, at least, two transmitting units.

After finished transmission of the segments, the transferred segments are put together to a complete data file. This is preferably made in the receiving unit.

By segment is related to a certain amount of information of a data file. According to the invention, the data file that shall be transmitted consists of at least two segments of the same size, or of varying sizes. The size and number of the segments, and which part of the file the segment constitutes, is determined by the unit that requests the transmission.

Examples of the data file existing at different transmitting units need not necessarily be identical copies of the data file. At transmission of most file types, however, the transmission and the subsequent putting together of the segments are facilitated if the examples are essentially similar both regarding size and content.

A request for transmission of a segment of a data file is preferably transmitted to a plurality of transmitting units in such a way that only one request for transmission is initially transmitted for respective segment, and that the segments together constitute the entire file.

Initially, preferably only one request for transmission of a segment of the data file is transmitted to respective transmitting unit.

According to a preferred embodiment of the invention, the transmission capacity of the transmitting units that first finish the requested transmission of a segment to the receiving unit, is also utilized for transmission of the segments for which the transmission has started but not been finished. This is preferably done by, when the transmission of a segment has been finished, a request for a transmission of a segment that has not been completely transferred, i.e. where the transmission is still in progress, being transmitted to the transmitting unit that has finished its transmission. The advantage achieved by this embodiment of the invention is that a plurality of segments can be transmitted from the transmitting units with highest capacity without any check or estimation of the transmission speeds being needed before transmission of the data file is requested. This step is repeated until all segments of the data file have been transferred. Preferably, but not necessarily, all transmissions of segments of the data file in question that have not been finished, are broken.

To achieve as high a total transmission speed as possible, a check is first made, according to an embodiment of the invention, for which segment, or from which transmitting unit, the transmission speed has been lowest, i.e. where the largest portion of the segment still remains to be transferred. After that, transmission of just this segment of the data file is requested. The advantage of this is that the risk of a blocking caused by the transmission from a transmitting unit being stopped, or being performed very slowly, for instance due to overload of network or server, is eliminated.

According to yet another embodiment of the invention, transmission of only a portion of a segment is requested from the unit that has completed transmission of a segment. This portion constitutes the portion, or part of the portion, of the segment, where transmission has not yet been completed. By that, no request for transmission of any portion of the data file that has already been transferred to the receiving unit is made, which results in the advantage that the total transmission speed can be further improved.

The portion of the segment for which transmission is requested can constitute the whole portion of the segment that remains to be transmitted, or, according to a preferred embodiment, a portion that constitutes a part of the remaining portion. How large part of the portion that shall be transferred is determined in relation to the transmission speeds for the transmitting unit that is busy transmitting the segment in question, and for the transmitting unit from which transmission of the part of the portion shall be requested. The size of said part of the portion is selected in such a way that the transmission of this part and the transmission of the remaining part of the portion, from the transmitting unit that has originally started the transmission of the segment, essentially takes the same time, which results in the advantage that the transfer time of this segment will be further shortened. The estimation of the transfer times is based on so far transmitted amount of the data file in question.

According to an alternative embodiment of the invention, the transmission speeds of the transmitting units that can be of current interest for the transmission of a data file, i.e., which have examples of the file in question, are estimated before transmission is requested. These estimated transmission speeds can with advantage be utilized to disregard the transmitting units with lowest transmission speeds. They also can be utilized to request transmission of segments of different sizes, where the size of respective segment is selected proportionally to respective transmission speed.

The present invention consequently results in the overall advantage that a sharing of the load that is caused by file transmission is effected in such a way that the route that on each occasion is least loaded will be most utilized for the transmission of the file in question. By that, the situation is also improved for the users who do not make use of the procedure or the device according to the present invention.

It should be realized that the above discussed embodiments and characteristics can be combined in advantageous ways, depending on present application.

Further characteristics of the invention will be obvious by the following description of exemplifying embodiments of these and by the enclosed patent claims.

BRIEF DESCRIPTION OF THE DRAWINGS

The invention now will be described by means of exemplified embodiments with reference to the enclosed figures, in which.

DETAILED DESCRIPTION OF PREFERRED EMBODIMENTS

Figure 1:
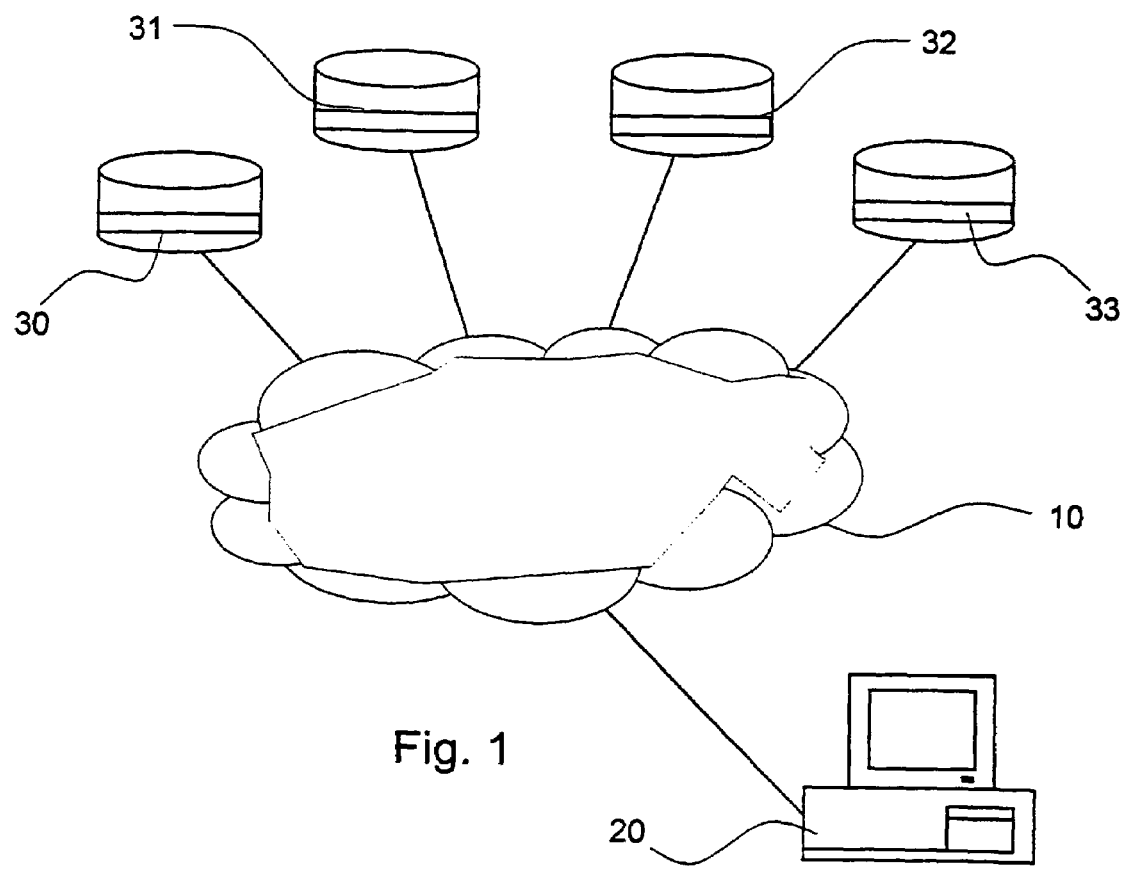
FIG. 1 diagrammatically shows a system to effect a procedure according to the present invention.

FIG. 1 shows diagrammatically a system to effect the procedure according to embodiments of the invention. The system includes a receiving unit or computer 20 and a number of transmitting units or servers 30, 31, 32, 33, which all are interconnected by connection to a network 10, which in preferred embodiments is constituted by Internet. With respective server 30, 31, 32, 33 is stored at least one example of a data file that one wants to have transmitted to the commuter 20. In order to facilitate the description, the number of illustrated servers has been limited to four, which should not be regarded as a limitation of, or recommmendation for, suitable number of servers.

Communication between computer and server is best performed according to standardized and well-known IP-protocols.

Figure 2A:
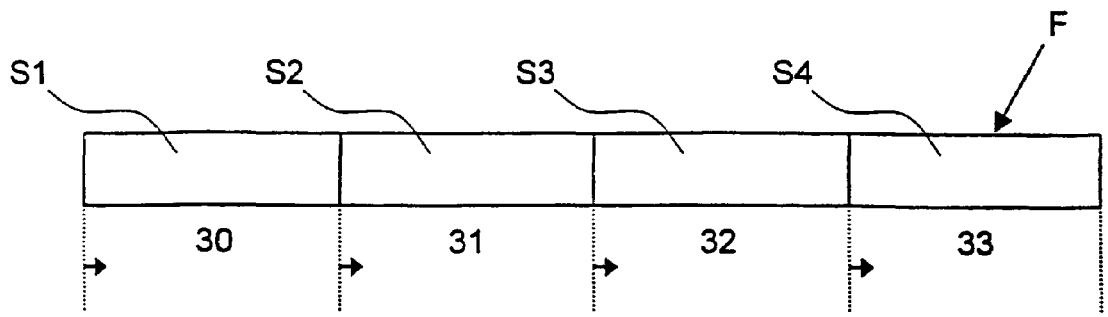
FIGS. 2a–2d diagrammatically shows a course of events according to a preferred embodiment of the present invention, FIGS. 3a–3d diagrammatically shows a course of events according to a preferred embodiment of the present invention, and FIG. 4a diagrammatically shows a step corresponding to the step that is shown in FIG. 2a, respective 3a, of a course of events of an alternative embodiment of the present invention.
Figure 2B:
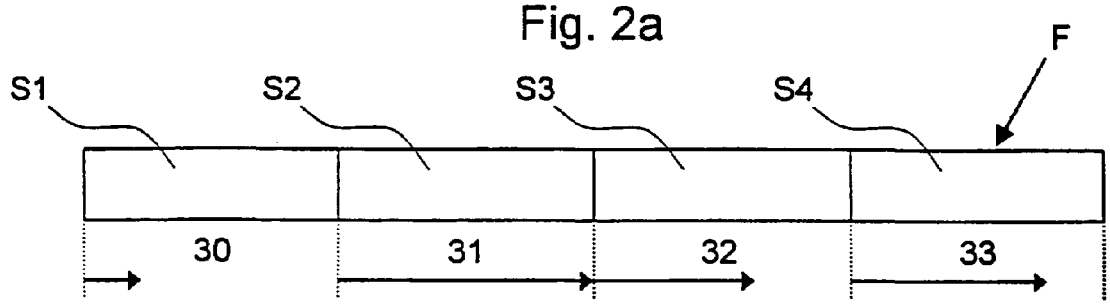

With reference to the FIGS. 2a–2b is diagrammatically shown an example of a course of events according to a preferred embodiment of a procedure according to the present invention. According to this example is supposed that the file one wants to have transferred can be loaded home from four different servers. The reference indication 40 refers to a schematically illustrated data file, which one wants to have transferred to the computer 20, and the reference indications S1–S4 indicate segments of the file F. According to this example, home-loading of the file F is requested from the servers 30–31. More specific, home-loading is requested of a first segment S1 of the file F from a first server 30, of a second segment S2 from a second server 31, of a third segment S3 from a third server 32, and of a fourth segment S4 from a fourth server 33. This is illustrated in FIG. 2a, where the figure under respective segment refers to the server 30–33 from which a transmission of respective segments S1–S4 has been requested, and where the arrow under respective segment illustrates how large part of the segment that has been transferred. As can be realized by the short arrows in FIG. 2a, this figure illustrates that the home-loading of the segments S1–S4 from the different servers 30–33 just has started.

Figure 2C:
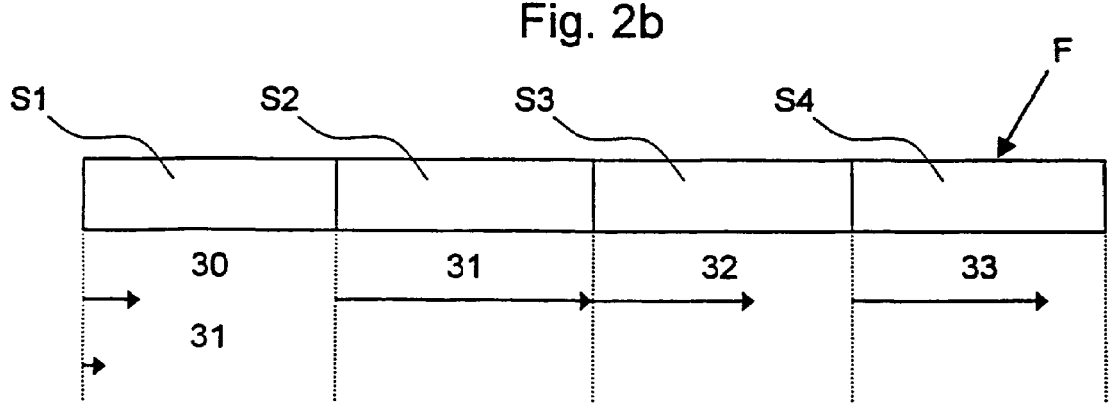

FIG. 2b illustrates the transmission of the segments S1–S4 when the transmission has been going on for a certain period of time. As can be seen in the Figure, the transmission of segment S1 from the server 30 is slow; the transmission of segment S2 from server 31 has been very fast and is already completed, whereas the transmission of the segments S3 and S4 from server 32 respective 33 is comparatively fast. When the home-loading of the segment S2 from server 31 is completed, the transmission is finished and transmission of one more segment of the data file F from server 31 is requested. Because segment S1 is the segment where the largest portion of the segment remains to be loaded home, transmission of just this segment is requested, which is illustrated in FIG. 2c, just after that transmission of segment S1 from server 31 has been requested. As can be seen in FIG. 2c the segment S1 is loaded home parallelly from both server 30 and 31 and the whole segment S1 is requested to be transferred from server 31.

Figure 2D:
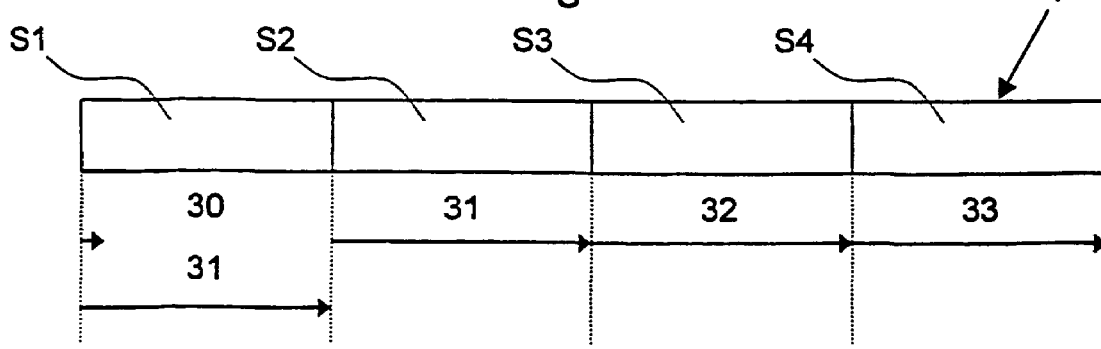

The transmission/transfer of the data file is completed when the transfer of all segments S1–S4 of the data file is completed. As can be seen in FIG. 2d, the server 31 has completed the transmission of segment S1, and the servers 32 and 33 have completed the transmission of segment S3 respective S4. Since the transmission of the segment S2 has previously been completed, all segments S1–S4 of the data file F have been transferred, and the transmission procedure can be stopped, i.e. the transmission in progress of segment S1 from server 30 is stopped. After that, the transmitted segments S1–S4 are put together, by the receiving computer, to the wanted file. In the described course of events, the transmission from the servers 31, 32 and 33 are completed essentially at the same point of time, which is not necessarily the case. If the transmission of any segment has been completed while the transmission of any other segment has not been completed, this segment is requested to be transferred from the server that has just completed its transmission. This is after that repeated until all segments are completely transferred.

Figure 3A:
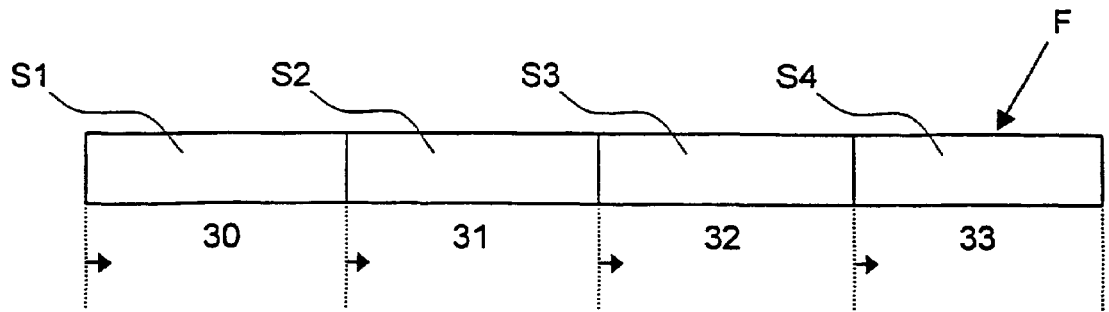
Figure 3B:
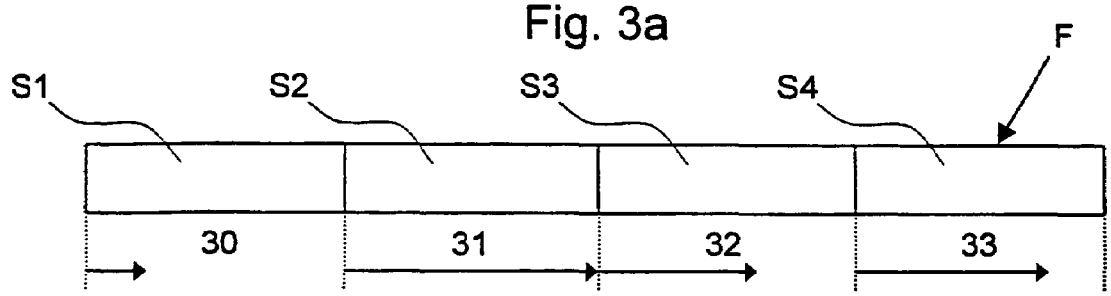
Figure 3C:
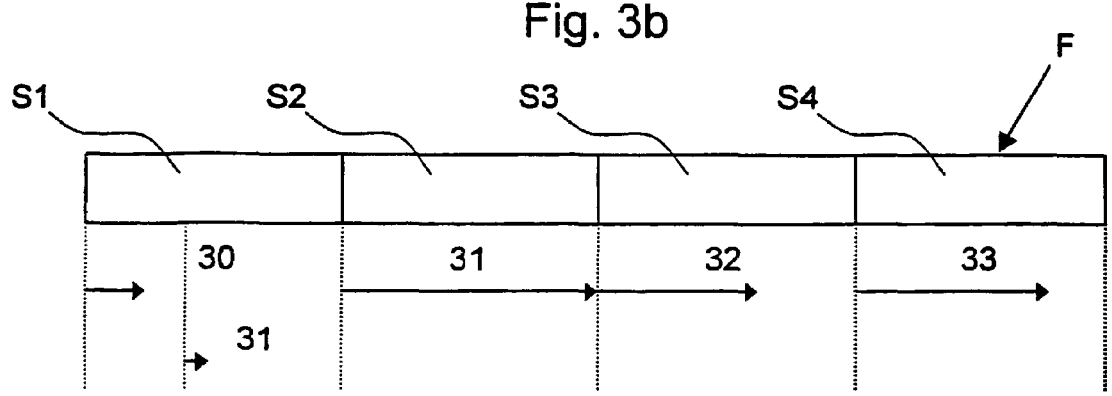
Figure 3D:
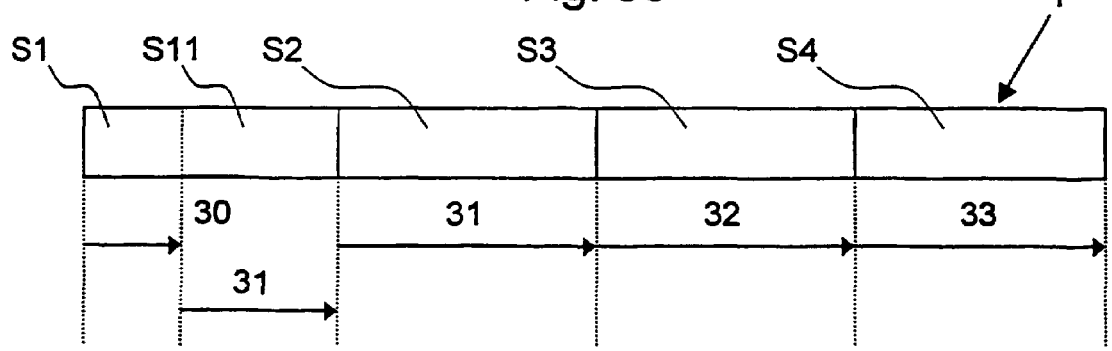

With reference to the FIGS. 3a–3d is shown diagrammatically a preferred embodiment of the invention. The FIGS. 3a and 3b show the course of events that was described above with reference to the FIGS. 2a and 2b, which, for that reason, will not be described in detail. In the same way as in the above described example, server 31 has completed the transmission of segment S2 and a transmission of segment S1, for which largest portion of the segment remains to be transmitted, is requested. At this request is taken into consideration how large part of the segment S1 that has already been transferred, i.e. it is only for that portion of the segment S1 that remains to be transmitted that transmission is requested. The transmission of the remaining portion of the segment S1 is then made parallelly, or, as is shown in FIG. 3c, the transmission of the remaining portion of the segment S1 is shared between the server 30 and server 31.

At this sharing the transmission speeds for server 30 and 31 are taken into consideration, and the remaining portion of the segment S1 is shared proportionally to these transmission speeds. The current transmission speeds are based on the portion of the segments that have already been transmitted from respective server. This means that, if server 31 relieves server 30 of the remaining portion, which is illustrated by the reference indication S11 in FIG. 3c, of the segment S1, and if the transmission from respective server is performed with the same speed as so far, the transmission of respective portion from the two servers 30, 31 will take essentially the same time.

Before transmission of the file is requested, the receiving computer 20 preferably first makes an estimation of the expected transmission speed from respective server, where examples of the wanted file are. This estimation is then used to select from which servers, which need not be all servers where examples of the files are, transmission of the file, or segment of the file, shall be requested.

Figure 4A:
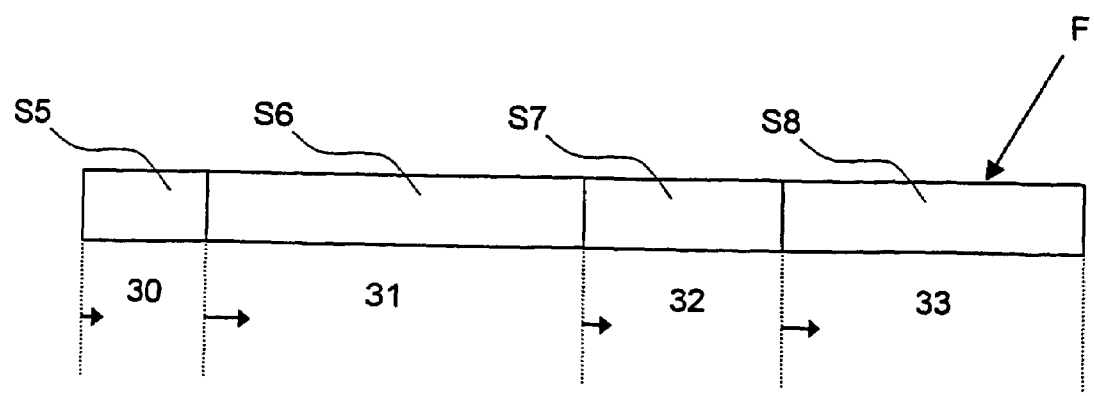

According to an alternative embodiment, this estimation is also used, as is shown as an example in FIG. 4a, to request transmission of segments S5–S8 of different sizes from the servers in question. According to this example, the transmission speed for server 30 has been estimated to be very high, so transmission of a larger segment S5 of the data file is requested from this server 31. The size of respective segment S5–S8 is determined preferably proportionally to the transmission speed for respective server 30–31. This means that the transmission from respective server 30–33 should take essentially the same time. If that is not the case, transmission of not completely transmitted segments is requested in the same way as has been described above.

Shown embodiments of the present invention can preferably be realized by implementation that utilizes File Transfer Protocol (FTP), which is a part of the IP-standard.

What is claimed is:

1. Procedure for control of data file transmission between transmitting units and receiving units, at which examples of a data file to be transmitted/transferred are stored at the transmitting units, comprising:
   requesting transmission of segments of the data file from the transmitting units;
   receiving said segments from the transmitting units;
   when the transmission of one of said segments from one of the transmitting units is completed, requesting transmission of one more segment of the data file from the one of the transmitting units after transmission of said one more segment from another transmitting unit has started; and
   requesting transmission of only a portion of said one more segment, the portion being included in a remainder of said one more segment that has not yet been transferred by the another transmitting unit.

2. Procedure as claimed in patent claim 1, wherein the requesting transmission of one more segment includes:
   determining a segment having a largest portion that remains to be transmitted; and
   requesting transmission of this determined segment.

3. Procedure as claimed in patent claim 1, wherein the requesting transmission of a portion of said one more segment includes:
   determining how large a portion of the one more segment remains to be transferred;
   estimating a transmission speed for the another transmitting unit that is busy transmitting said one more segment and for the one of the transmitting units from which transmission of said portion is to be requested;
   determining, depending on the estimate transmission speeds, how large said portion shall be; and
   requesting transmission of said portion.

4. Procedure as claimed in patent claim 1, further comprising:
   estimating transmission speeds from respective transmitting units; and
   requesting transmission of segments of different sizes, at which a size of respective segments is determined based on the estimated transmission speeds.

5. Procedure as claimed in patent claim 1, further comprising:
   estimating transmission speeds from respective transmitting units; and
   selecting transmitting units with regard to the estimated transmission speed from the respective transmitting units.

6. Device for control of data file transmission between transmitting units and receiving units, at which examples of a data file to be transferred are stored at a plurality of transmitting units, comprising:
   a device to request transmission of segments of the data file from the transmitting units;
   a device to receive said segments from the transmitting units;
   when the transmission of one of said segments from one of the transmitting units is completed, to request transmission of one more segment of the data file from the one of the transmission units after transmission of the one more segment from another transmitting unit has started; and
   a device to request transmission of only a portion of said one more segment, the portion being included in a remainder of said one more segment that has not yet been transferred by the another transmitting unit.

7. Device as claimed in patent claim 6, wherein the device to request transmission of one more segment includes:
   a device to determine a segment having a largest portion that remains to be transmitted; and
   a device to request transmission of this determined segment.

8. Device as claimed in patent claim 7, wherein the device to request transmission of a portion of said one more segment, includes:

a device to determine how large a portion of the one more segment remains to be transferred;

a device to estimate a transmission speed for the another transmitting unit which is busy transmitting said one more segment and for the one of the transmitting units from which transmission of said portion is to be requested;

a device to determine, depending on the estimated transmission speeds, a size of said portion; and a device to request transmission of said portion.

9. Device as claimed in patent claim 6, further comprising:

a device to estimate transmission speeds from respective transmitting units; and a device to request transmission of segments of different sizes and to determine the size of respective segment based on the estimated transmission speeds.

10. Device as claimed in patent claim 6, further comprising:

a device to estimate transmission speeds from respective transmitting units; and a device to select transmitting units for the transmission with regard to the estimated transmission speed from the respective transmitting units.

\* \* \* \* \*